United States Patent [19]

Huizinga et al.

[11] 4,413,159

[45] Nov. 1, 1983

[54] DIAL PULSING CIRCUIT

[75] Inventors: Donald D. Huizinga; Donald R. Means, both of Indianapolis; Edward W. Underhill, Knightstown, all of Ind.

[73] Assignee: Bell Telephone Laboratories, Incorporated, Murray Hill, N.J.

[21] Appl. No.: 364,752

[22] Filed: Apr. 2, 1982

[51] Int. Cl.³ .............................................. H04M 1/31
[52] U.S. Cl. .............................. 179/90 K; 179/81 R; 179/16 EC; 179/84 R
[58] Field of Search .............. 179/90 K, 81 R, 16 EC, 179/90 R, 84 R

[56] References Cited

U.S. PATENT DOCUMENTS

| | | | |
|---|---|---|---|
| 3,932,707 | 1/1976 | Connolly et al. | 179/16 AA |
| 3,969,592 | 7/1976 | Pipitone et al. | 179/90 K |
| 3,973,084 | 8/1976 | Houland | 179/90 K |
| 3,980,837 | 9/1976 | Jakobsson | 179/90 K |
| 4,008,379 | 2/1977 | Watkins | 179/90 K |
| 4,167,655 | 9/1979 | Hestad et al. | 179/90 K |
| 4,286,120 | 8/1981 | Sublette | 179/90 K |
| 4,329,546 | 5/1982 | Montesi et al. | 179/90 K |

*Primary Examiner*—Stafford D. Schreyer
*Attorney, Agent, or Firm*—S. M. Gurey

[57] ABSTRACT

In order to provide push-button telephone service to those telephone systems not equipped to respond to multifrequency dialing signals, it is necessary to convert push-button dialed digits into conventional dial pulses. A pulse train consisting of make and break intervals representing the dialed digit is electronically converted (107) into a corresponding series of make and break intervals on the telephone line (102, 103) by switching (106, 108-1, 108-2) a pulsing transistor (101) that is in series with the telephone line ON and OFF. In order to keep the pulsing transistor ON during nondialing intervals and during each make interval, and not attenuate the voice signal, the pulsing transistor is biased by an adjustable current source (105). The current needed to bias the pulsing transistor ON is linearly related to the telephone line current flowing through the emitter-collector path of the transistor, and which varies considerably from station-to-station. In order to minimize the current needed to bias the pulsing transistor, a current sensor (104) derives a signal proportional to the line current which, in turn, is fed back to the current source (105) in order to adjust the bias current to be proportional to the line current.

13 Claims, 3 Drawing Figures

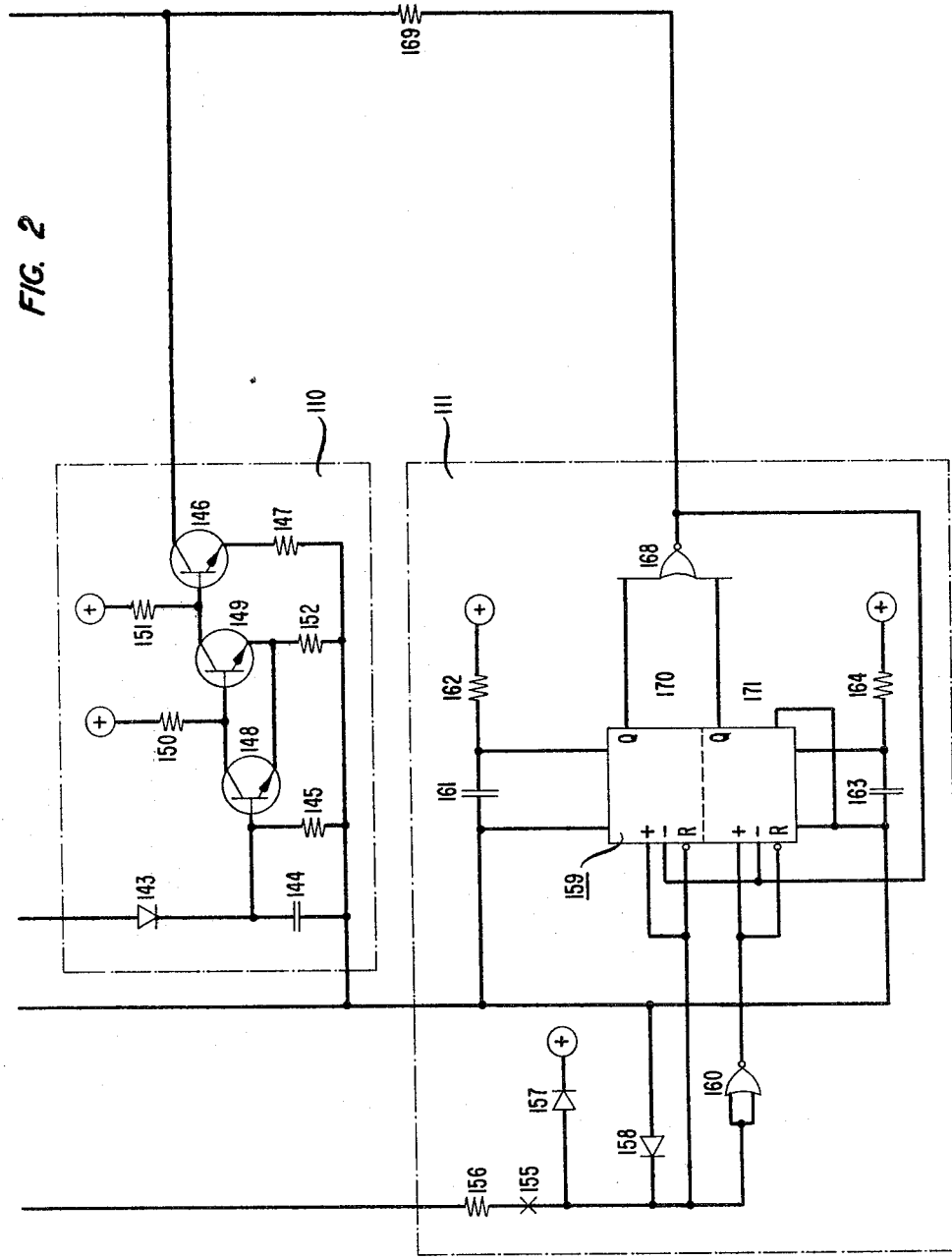

4,413,159

DIAL PULSING CIRCUIT

TECHNICAL FIELD

This invention relates to telephone station apparatus and, in particular, to circuitry which converts push-button dial inputs to conventional dial pulses.

BACKGROUND OF THE INVENTION

In order to provide push-button dialing service in those telephone systems which are incapable of responding to multifrequency dialing tones, telephone circuitry is required to convert each push-button input to a conventional series of dial pulses which are recognizable by central offices. Such circuitry must convert each push-button input into a series of breaks, or interruptions, of the line current that are transmitted on the telephone line from the station apparatus to the central office, the number of such breaks being equal to the digit dialed. These make-break intervals must occur at standard repetition rates with standard make-break ratios so that the central office can properly detect the digit dialed.

When dial pulses are not generated by the electromechanical action of a rotary dial but, instead, are electrically generated in response to a push-button input, a pulsing element is required to interrupt the line current at the appropriate rate. One technique is to place the pulsing element across the tip and ring leads of the telephone line. During dialing, the pulsing element opens and closes the telephone line, while the other telephone circuitry is isolated from the telephone line. After dialing, the pulsing element is disconnected from the tip and ring leads, thereby preventing any deleterious effects on the voice signal. A disadvantage of isolating the telephone circuitry from the pulsing circuitry during the dialing interval is that power cannot be readily derived from the telephone line during each make interval.

An alternate technique for generating dial pulses is to place a pulsing element in series with the telephone line and the rest of the telephone circuitry. Dial pulses are generated by repetitively turning the pulsing element ON and OFF which creates breaks in the line current. During each make interval, the telephone line is connected to the telephone line and power can be derived therefrom. In U.S. Pat. No. 3,932,707, dial pulsing circuitry is disclosed in which a relay is employed to pulse the line current. A relay, however, requires more power than may be available, if the telephone is completely line powered.

A transistor, in series with the telephone line and the other telephone circuitry, is a preferable pulsing element for creating dial pulses by pulsing the conduction state of the transistor, since the circuitry can be powered totally by the telephone line. During nondialing intervals, this pulsing transistor must be biased to be in the conductive ON state. Enough base current must, therefore, be supplied to keep the pulsing transistor ON. The amount of base current necessary to saturate the transistor, however, is a function of the emitter-collector current through the transistor and the $\beta$ gain coefficient of the transistor. The emitter-collector current is essentially the line current, which can vary between two milliamps and in excess of one hundred milliamps, depending upon several factors, including, most significantly, the length of the telephone loop. In order for the pulsing circuitry to operate in all installations, enough base current must be supplied to saturate the pulsing transistor for the maximum possible line current. Typically, a transistor is biased through resistive circuitry connected to the base. Resistive circuitry small enough to provide enough base current to saturate the transistor for all possible variations of line current will, however, provide an alternate path for the voice signal resulting in attenuation of the signal, thereby affecting the quality of service provided.

In U.S. Pat. No. 4,008,379, a circuit is disclosed in which two transistors in a standard Darlington configuration, are connected in series with a telephone line for dial pulsing purposes. By using a Darlington pair, a larger biasing resistor can be used in the base circuit for biasing than would be required for use with a single pulsing transistor. However, such a circuit still might not provide a sufficiently high AC impedance across the telephone line to ensure negligible attenuation of voice signals. Furthermore, there is a significantly higher voltage drop across a Darlington pair than across a single transistor, which limits the voltage available to the rest of the telephone circuitry when there is a fixed total voltage requirement.

As an alternative to resistive biasing of a pulsing transistor, a current source can be employed to provide sufficient base current to the transistor to keep it saturated. A current source has essentially infinite AC impedance, and will not cause attenuation of the voice signal. Because of the wide variation in line current, as discussed hereinabove, a current source designed to supply sufficient current to saturate the pulsing transistor in the presence of the maximum possible line current will draw too much current in those network situations when the line curent is at its minimum possible value. As a result, insufficient current will be supplied to the rest of the telephone circuitry, thereby inhibiting its operation.

SUMMARY OF THE INVENTION

The above-noted problems and limitations are avoided in a dial pulsing circuit having a pulsing transistor in series with the telephone line. In accordance with the present invention, the magnitude of a current source connected to bias the pulsing transistor is controlled, in a feedback loop, by the magnitude of the line current.

One advantage of using a controlled current source is that station-to-station line current variations are accounted for in the circuit design so that the magnitude of the current needed to bias the pulsing transistor is minimized.

A second advantage is that there is negligible attenuation of the voice signal.

BRIEF DESCRIPTION OF THE DRAWING

FIGS. 1 and 2, when aligned together, as illustrated in FIG. 3, show a circuit diagram of a dial pulsing circuit in accordance with the present invention.

DETAILED DESCRIPTION

Figure 1:
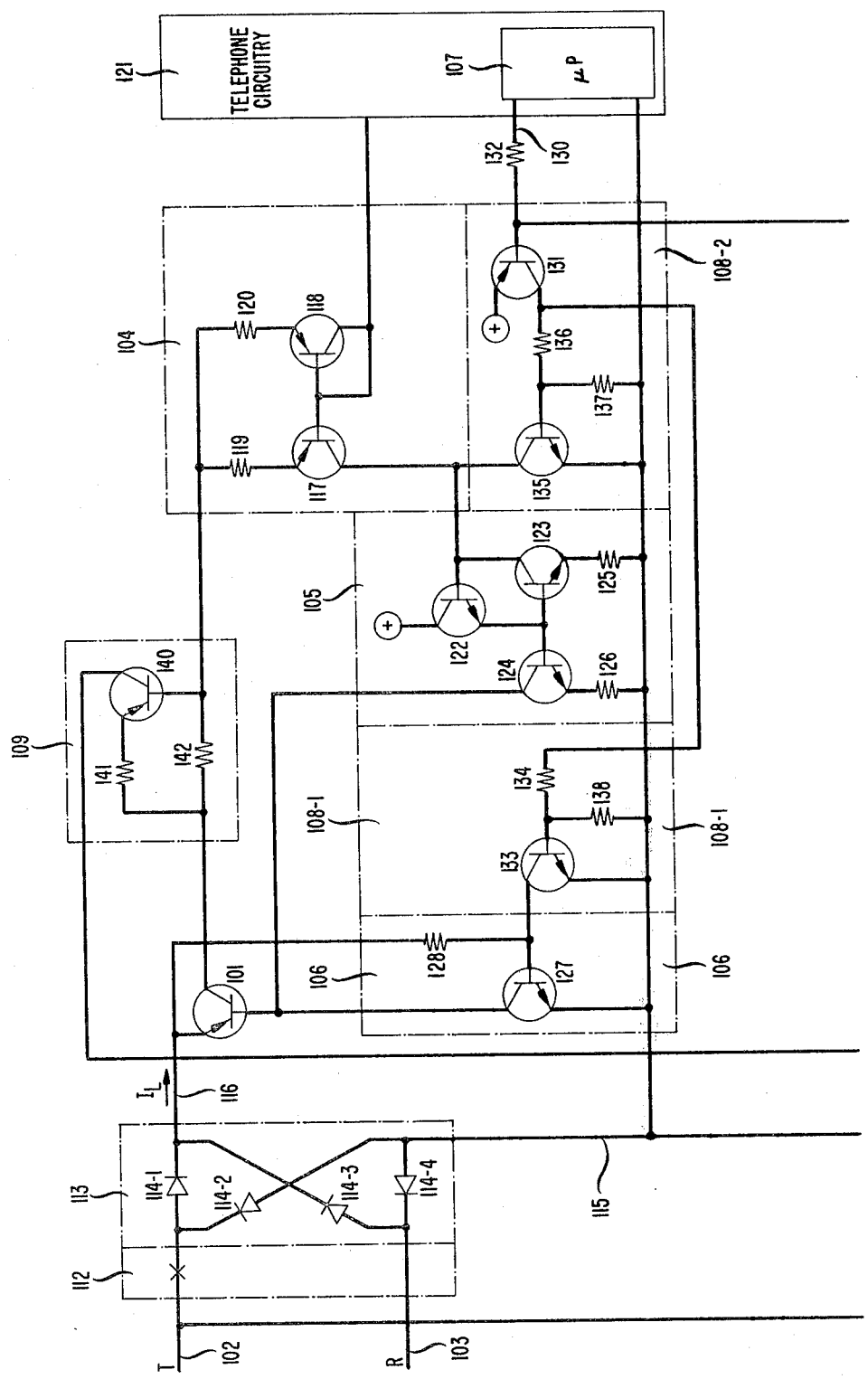

The operation of the dial pulsing circuit shown in FIGS. 1 and 2 will be broadly described immediately hereinbelow. A more detailed description will follow thereinafter.

With reference to FIGS. 1 and 2, the emitter and collector electrodes of pulsing transistor 101 are in series with the telephone line consisting of tip and ring leads 102 and 103, respectively. A current sensor circuit 104 senses the magnitude of the current through the collector of pulsing transistorf 101 and provides a feedback signal to a current source 105. This feedback signal causes current source 105 to maintain the magnitude of the base current of pulsing transistors 101 at a value equal to $I_L$ (the line current)/$\beta_{min}$, where $\beta_{min}$ is the minimum $\beta$ expected for transistors of the type used as pulsing transistor 101. It is well known that a transistor will saturate when its base current is greater than $I_C$ (collector current)/$\beta$. Thus, when the $\beta$ coefficient of pulsing transistor 101 is greater than $\beta_{min}$, the magnitude of the output current of current source 105 is sufficient to keep pulsing transistor 101 saturated and in the ON state. Further, the magnitude of this base curent is proportional to the line current $I_L$.

When the telephone station set is on-hook, no line current flows and pulsing transistor 101 is in the OFF state. When the telephone station set is taken off-hook, pulsing transistor 101 will not turn ON without separate means to initiate conduction since current sensor 104 has no current to detect and feed back to current source 105. In order to effect the transition to the ON state, a start-up circuit 106 provides a small amount of current to the base of pulsing transistor 101 to start transistor 101 conducting. Once pulsing transistor 101 starts conducting, current sensor 104 provides feedback to current source 105 to maintain pulsing transistor 101 in the conductive ON state.

Dial pulses are created by turning pulsing transistor 101 ON and OFF in response to a push-button input. Each push-button input is electronically converted by a microprocessor 107 within the telephone circuitry 121 into a pulse train consisting of a number of pulses equal to the dialed digits, which pulses vary between two discrete voltages, and whose pulse repetition rate and make-break ratio conform to the requirements of the telephone system. Details of the telephone circuitry 121 and microprocessor 107 are not part of the present invention and will not be disclosed herein.

In response to each pulse generated by microprocessor 107, turn-off circuits 108-1 and 108-2 act to turn pulsing transistor 101 OFF. After each individual break interval in the pulse train, pulsing transisor 101 is turned ON again by the action of start-up circuit 106, current sensor 104, and current source 105. Each make and break interval in the pulse train generated by microprocessor 107 is converted into coincident make and break intervals in the line current which are recognizable at the central office as dial pulses.

In addition to dial pulsing capabilities, the dial pulse circuit of the present invention is capable of detecting and responding to current surges on the telephone line which can be harmful to the pulsing transistor 101 and the rest of the telephone circuitry 121. A surge current sensor 109 responds to high-current surges of the line current by triggering a shut-down circuit 110 which, in turn, triggers turn-off circuitry 108-1 and 108-2. As aforenoted, these circuits turn pulsing transistors 101 OFF, thereby isolating this transistor and the rest of the telephone circuitry from the telephone line.

In some foreign countries, restricted calling is available as a central office option. With such an option, the central office sends out a signal known as a fleeting test reversal (FTR) after receiving a certain number of dialed digits. This FTR is a momentary reversal of the polarity of the tip and ring leads of the telephone line. When activated at the telephone station, a high impedance appears across the telephone line during the FTR. If the central office detects such a high impedance during the FTR, succeeding dialed digits will not be recognized by the central office, thereby preventing call completion. Use of the telephone station can thus be limited to local calls. Such a restricted calling option is useful in those situations where it is desirable to prevent unrestricted calling access on selected telephone instruments which is useful for example, in certain business applications. The embodiment of the present invention disclosed herein includes a category change circuit 111 which, in response to an FTR, turns transistor 101 OFF, thereby presenting a high impedance across the telephone line to the central office.

A detailed description of the circuits functionally described hereinabove follows below.

The tip and ring leads 102 and 103, respectively, of the telephone line are connected through switch-hook 112 to a polarity guard circuit 113. Polarity guard circuit 113 consists of four diodes 114-1, 114-2, 114-3, and 114-4 connected in a standard configuration. Polarity guard 113 assures that the voltage on lead 116 is always positive with respect to the voltage on lead 115, irrespective of the polarity of the voltages on tip and ring leads 102 and 103. Lead 115 is referred to as guarded or protected ring lead, and acts as a reference for the circuitry in FIGS. 1 and 2. The current on lead 116 is defined as the line current $I_L$, the magnitude of which controls the biasing of pulsing transistor 101.

Lead 116 is connected to the emitter of pulsing transistor 101. The collector of pulsing transistor 101 is connected to line current sensor 104 through resistor 142 of surge current sensor 109. Line current sensor 104 consists of transistors 117 and 118 and resistors 119 and 120, connected as a standard current mirror circuit. Resistors 119 and 120 are selected so that a small fraction of the current flowing into current sensor 104 flows through the collector of transistor 117, with the rest of the current flowing through the collector of transistor 118 to the remaining telephone circuitry 121. The current through the collector of transistor 117 is proportional to the current through the collector of pulsing transistor 101 which, in turn, is proportionally related to the line current $I_L$.

The collector of transistor 117 is connected to the base of transistor 122 in current source 105. Current source 105 consists of transistors 122, 123, and 124, and resistors 125 and 126, also connected as a current mirror. The collector of transistor 122 is biased by a positive voltage. The output current of current source 105, the collector current of transistor 124, is proportional to the fraction of line current $I_L$, fed from current sensor 104. The current source 105 output current provides the base current to pulsing transistor 101 that maintains it in the ON state. By appropriately choosing the values of resistors 119, 120, 125, and 126, the output current of current source 105 is maintained at a predetermined fraction of the line current, in particular, $I_L/\beta_{min}$. For a $\beta_{min}$ of 10, current source 105 provides $I_L/10$ to the base of pulsing transistor 101, irrespective of the value of $I_L$. Thus, if pulsing transistor 101 has a $\beta$ gain coefficient greater than 10, it will be biased with sufficient base current to keep it saturated.

The above-described interaction between pulsing transistor 101, line current sensor 104, and current source 105 assumed that pulsing transistor 101 is in the ON state, and current flows therethrough. As previously described, pulsing transistor 101 is initially in the OFF state when the station goes off-hook. Start-up circuit 106, consisting of transistor 127 and resistor 128, initiates conduction in pulsing transistor 101. When the switch hook 112 is closed, current flows through resistor 128 to the base of transistor 127. A small amount of current is drawn through the base of pulsing transistor 101 into the collector of transistor 127, causing pulsing transisor 101 to begin conducting. Once pulsing transistor 101 begins conducting, the positive feedback provided by line current sensor 104 and current source 105 to the base of pulsing transistor 101 causes transistor 101 to saturate quickly. By choosing resistor 128 to have a relatively high resistance, the current drawn through resistor 128 will not be sufficient to saturate transistor 127. Transistor 127 will thus be operating in the active region and present a high AC impedance across the telephone line which prevents undue attenuation of voice signals.

As previously described, telephone circuitry 121 includes a microprocessor 107 which electronically converts each push-button dialed digit into a pulse train having a number of pulses equal to the dialed digit. For example, if the digit dialed is "5", then microprocessor 107 generates a pulse train consisting of five pulses at the standard pulse repetition rate of ten pulses per second. In the United States, each pulse consists of a 40% make interval, followed by a 60% break interval, or equivalently, 0.04 seconds make, followed by, 0.06 seconds break. The European make-break ratio is 1:2. Accordingly, each pulse consists of a 0.0333-second make interval followed by a 0.0666-second break interval. Nominally, microprocessor 107 has as its output a positive DC voltage with respect to the reference potential of a guarded ring lead 115. During each break interval, the output voltage on lead 130 of microprocessor 107 is pulsed to this reference potential.

Pulsing transistor 101 is pulsed ON and OFF in response to the pulses generated by microprocessor 107 as follows. When the voltage on lead 130 drops during the break interval of a pulse, the normally OFF transistor 131 in turn-off circuit 108-2 is turned ON through resistor 132. This causes transistor 133 to turn ON through resistor 134 in turn-off circuit 108-1, thereby turning transistor 127 OFF in start-up circuit 106. Also, in turn-off circuit 108-2, when transistor 131 goes ON, transistor 135 is turned ON through resistor 136, thereby turning OFF the entire current mirror circuit, including transistors 122, 123, and 124. With both transistors 127 and 124 OFF, no current is supplied to the base of pulsing transistor 101 and it switches OFF. When the voltage on lead 130 returns to its normal positive potential during the next make interval, or at the end of the pulse train, transistor 131 turns OFF, thereby causing transistors 133 and 135 to turn OFF again. Resistor 137, in turn-off circuit 108-2, and resistor 138, in turn-off circuit 108-1, function as pull-down resistors that ensure that transistors 135 and 133, respectively, remain OFF as long as transistor 131 is OFF. Pulsing transistor 101 is switched ON again through the action of start-up circuit 106 and the interaction of line current sensor 104 and current source 105, as previously described.

As aforenoted, protection against line current surges which may damage pulsing transistor 101 and the rest of the telephone circuitry, is provided by surge current sensor 109 and shut-down circuit 110. Surge current sensor 109 consists of transistor 140 and resistors 141 and 142. When the current through resistor 142 develops a voltage sufficient to turn ON transistor 140, current flows through resistor 141 and the emitter-collector path of transistor 140 to shut-down circuit 110. The value of resistor 142 determines the current at which transistor 140 will turn ON.

Shut-down circuit 110 consists of diode 143, capacitor 144, resistor 145, transistor 146, and resistor 147. It also includes transistors 148 and 149, and resistors 150, 151, and 152 which all are connected as a standard Schmitt trigger circuit. The current flowing from the collector of transistor 140 into the shut-down circuit 110 charges capacitor 144. When the voltage across capacitor 144 reaches the turn-on threshold voltage of the Schmitt trigger circuit, transistor 149 turns OFF, allowing transistor 146 to turn ON through resistor 151. This causes transistor 131 to turn ON, thereby switching pulsing transistor 101 OFF in the manner previously described. When pulsing transistor 101 is OFF, it and the rest of the telephone circuitry is protected from the high line current surges. Once pulsing transistor 101 is switched OFF, transistor 140 turns OFF and capacitor 144 begins to discharge through resistor 145. Diode 143 prevents capacitor 144 from discharging through the rest of the circuit. When capacitor 144 has discharged to the turn-off threshold voltage of the Schmitt trigger, transistor 149 turns ON again, turning transistor 146 OFF, which, in turn, turns transistor 131 OFF. The pulsing transistor 101 is switched ON through the action of the start-up circuit 106 and the interaction of current sensor 104 and current source 105. The length of time pulsing transistor 101 is shut OFF in response to a surge is determined by the turn-on and turn-off threshold voltages of the Schmitt trigger, and the RC time constant of resistor 145 and capacitor 144.

When category change circuit 111 is activated by the closure of contact 155, pulsing transistor 101 turns OFF and thereby presents a high impedance across the telephone line for the duration of each Fleeting Test Reversal (FTR) transmitted by the central office. When so activated, category change circuit 111 monitors the polarity of the voltage on tip lead 102 relative to the voltage on the reference-protected ring lead 115. Tip lead 102 is connected to resistor 156 which, together with diodes 157 and 158, forms an input protection circuit which limits the voltage input to the integrated circuits within category change circuit 111. The output of the input protection circuit is connected to the positive trigger input and a negated reset input of a first one-shot circuit 170 in a dual-precision monostable multivibrator 159. The output of the input protection circuit is also connected to both inputs of a NOR gate forming an inverter 160. The output of inverter 160 is connected to the positive trigger input and negated reset input of the second multivibrator one-shot circuit 171 in dual multivibrator 159. Dual multivibrator 159 can be any one of several commercially available dual precision multistable multivibrators, such as Motorola MC14538. Multivibrator 159 consists of two identical one-shot circuits 170 and 171 within one package. The width of the output pulse generated by one-shot circuit 170 is determined by the time constant of the RC network consisting of resistor 162 and capacitor 161. Similarly, the width of the output pulse generated by one-shot circuit 172 is determined by the time constant of the RC network consisting of resistor 164 and capacitor 163. The Q outputs of one-shots 170 and 171 are both connected to inputs of a NOR gate 168. The output of NOR gate 168 is connected through resistor 169 to the base of transistor 131. The output of NOR gate 168 is also connected to the negative trigger inputs ("−") of one-shots 170 and 171.

Prior to a change in polarity of the voltage on lead 102, each one-shot is in the quiescent state. The Q outputs of one-shots 170 and 171 are low (logical "0"); and the output of NOR gate 168 is high (logical "1"). An FTR which results in a positive transition in the voltage on lead 102, triggers the "+" input of one-shot 170, causing its Q output to go from a logical "0" to a logical "1". The positive transition on tip lead 102 is converted into a negative transition by inverter 160 which, when applied to the "+" input of one-shot 171, does not change its logical "0" Q output. The "1" and "0" Q outputs of one-shots 170 and 171 are combined by NOR gate 168 to produce a logical "0" (low) output. This turns transistor 131 ON, thereby turning pulsing transistor 101 OFF in a manner hereinabove described. Logical "0's" at the "−" inputs of one-shots 170 and 171 inhibit a positive transition from retriggering either one-shot. If the pulse width of the positive transition on tip lead 102 is less than the pulse width of multivibrator as determined by values of capacitor 161 and resistor 162, then the negative transition at the end of the pulse triggers the reset R input of one-shot 170, thereby changing its Q output back to "0". This negative transition is inhibited from triggering the "+" input of one-shot 171 since its "−" is held low ("0") from the output of NOR gate 168. The output of NOR gate 168 again becomes high ("1"), and transistor 131 is turned OFF. Pulsing transistor 101 is turned ON by the action of the start-up circuit 106, and the interaction of line current sensor 104 and current source 105.

A fleeting test reversal which results in a negative transition in the voltage on tip lead 102, produces a logical "1" at the output of inverter 160 which triggers one-shot 171. The resultant logical "0" at the output of NOR gate 168 turns transistors 131 ON and pulsing transistor 101 OFF. If this negative transition on tip lead 102 lasts less than the pulse width of one-shot 171, as determined by the RC time constant of resistor 164 and capacitor 163, then pulsing transistor 101 remains OFF for the duration of the FTR.

In summary, an FTR of either polarity turns pulsing transistor 101 OFF for the duration of the FTR, thereby presenting a high impedance to the line. Phase reversals, which normally can occur and which last longer than the time constant of either one-shot, cause pulsing transistor 101 to turn OFF for the duration of the pulse produced by either one-shot.

The above-described arrangement is illustrative of the application and principles of the invention. Other embodiments may be devised by those skilled in the art without departing from the spirit and scope of the invention.

What is claimed is:

1. A dial pulsing circuit for converting a pulse train representing a dialed digit into corresponding interruptions of the line current on a telephone line comprising in combination, a pulsing transistor, means for connecting said pulsing transistor in series with said telephone line, pulsing means for turning said pulsing transistor ON and OFF in response to said pulse train, an adjustable current source connected to said pulsing transistor for biasing said transistor in the conductive ON state, and means for adjusting said current source in response to the magnitude of the line current on said telephone line.

2. A dial pulsing circuit in accordance with claim 1 wherein said pulse train consists of a series of make and break intervals and said pulsing means includes turn-off means for turning said pulsing transistor OFF during each break interval.

3. A dial pulsing circuit in accordance with claim 2 wherein said pulsing means further includes start-up means to start said pulsing transistor conducting after an interval when said transistor is in a nonconductive OFF state.

4. A dial pulsing circuit in accordance with claim 3 wherein said start-up means comprises means for supplying a small bias current to said pulsing transistor.

5. A dial pulsing circuit in accordance with claim 3 wherein said turn-off means turns OFF said start-up means and said adjustable current source during each break interval.

6. A dial pulsing circuit in accordance with claim 5 further comprising means for detecting current surges on said telephone line and turning said pulsing transistor OFF when said surges exceed a predetermined threshold.

7. A dial pulsing circuit in accordance with claim 5 further comprising means for detecting polarity reversals on said telephone line and turning said pulsing transistor OFF in response thereto.

8. A dial pulsing circuit in accordance with claim 7 wherein said means for detecting polarity reversals includes means for generating an output pulse having a pulse width equal to the duration of said polarity reversal when said duration of said polarity reversal is less than a predetermined value, and for generating an output pulse having a pulse width equal to said predetermined value when the duration of polarity reversal exceeds said predetermined value, said turn-off means turning said pulsing transistor OFF in response to said output pulse.

9. A dial pulsing circuit in accordance with claim 5 wherein said adjusting means includes a current mirror circuit which derives from the current through said pulsing transistor a current proportional to said line current which is fed to said adjustable current source.

10. A dial pulsing circuit in accordance with claim 9 wherein said adjustable current source includes a second current mirror circuit which is responsive to the current derived from the current mirror in said adjusting means and which provides a current to bias said pulsing transistor that is proportional to said line current.

11. A dial pulsing circuit for converting a pulse train of make and break intervals corresponding to a dialed digit into corresponding make and break intervals on a telephone line on which line current flows comprising in combination, a pulsing transistor having emitter, collector and base electrodes, means for connecting the emitter and collector elecrtrodes of said pulsing transistor in series with said telephone line, an adjustable current source connected to said base electrode for biasing said pulsing transistor in the conductive ON state, means for turning said transistor OFF in response to each break interval in said pulse train, start-up means for turning said transistor ON following an interval when said transistor is OFF, and current sensing means in series with the emitter and collector electrodes of said pulsing transistor for deriving from the current through said transistor a current to adjust said adjustable current source so that the biasing base current of said pulsing transistor is proportional to the telephone line current.

12. A dial pulsing circuit in accordance with claim 11 further comprising means for detecting current surges on said telephone line, and means for turning said pulsing transistor OFF in response to surges having a greater than a predetermined magnitude.

13. A dial pulsing circuit in accordance with claim 12 further comprising means for detecting polarity reversals on said telephone line and for turning said pulsing transistor OFF for the duration of said reversal when said reversal lasts for less than a predetermined interval and for turning said pulsing transistor OFF for a said predetermined interval when said reversal lasts for longer than said predetermined interval.

* * * * *